United States Patent [19]

Kness

[11] Patent Number: 4,711,049
[45] Date of Patent: Dec. 8, 1987

[54] ANIMAL TRAP
[75] Inventor: Lester E. Kness, Granger, Iowa
[73] Assignee: Kness Manufacturing Co., Inc., Albia, Iowa
[21] Appl. No.: 912,789
[22] Filed: Sep. 25, 1986
[51] Int. Cl.⁴ .......................................... A01M 23/30
[52] U.S. Cl. ...................................................... 43/81
[58] Field of Search .............................. 43/81, 82, 83

[56] References Cited

U.S. PATENT DOCUMENTS

| | | | |
|---|---|---|---|
| 1,462,739 | 7/1923 | Champlin | 43/83 |
| 1,464,559 | 8/1923 | Britan | 43/81 |
| 2,002,095 | 5/1935 | McCabe | 43/81 |
| 2,216,529 | 10/1940 | Brzykcy | 43/81 |
| 2,517,928 | 8/1950 | Richards | 43/81 |
| 2,616,211 | 11/1952 | Johnson | 43/81 |
| 4,245,423 | 1/1981 | Souza et al. | 43/81 |

Primary Examiner—M. Jordan
Attorney, Agent, or Firm—Zarley McKee, Thomte, Voorhees & Sease

[57] ABSTRACT

An animal trap comprises a base frame having an upper surface and a jaw member pivotally mounted on the base for pivotal movement from a cocked position to a sprung position, the jaw member having at least one horizontal bar extending transversely of the base. Spring means yieldably urge the jaw member to the sprung position. A catch member is pivotally mounted on the frame also and includes a catch pawl for retentively engaging the bar of the jaw member to hold the bar in its cocked position. The catch member is pivotal away from retentive engagement with the bar to release the jaw member so that it can return to its original position. A trip member is also pivotally mounted on the base, and is movable to a set position engaging the catch member to hold the catch member against the bar when the bar is in its locked position. The trip member is movable to release the catch member which in turn releases the bar and permits the jaw member to pivot to its sprung position. The trip member is engaged by the jaw frame and urged to its release position whenever the jaw frame is in its sprung position. A small spring urges the trip member to its set position at all other times.

1 Claim, 10 Drawing Figures

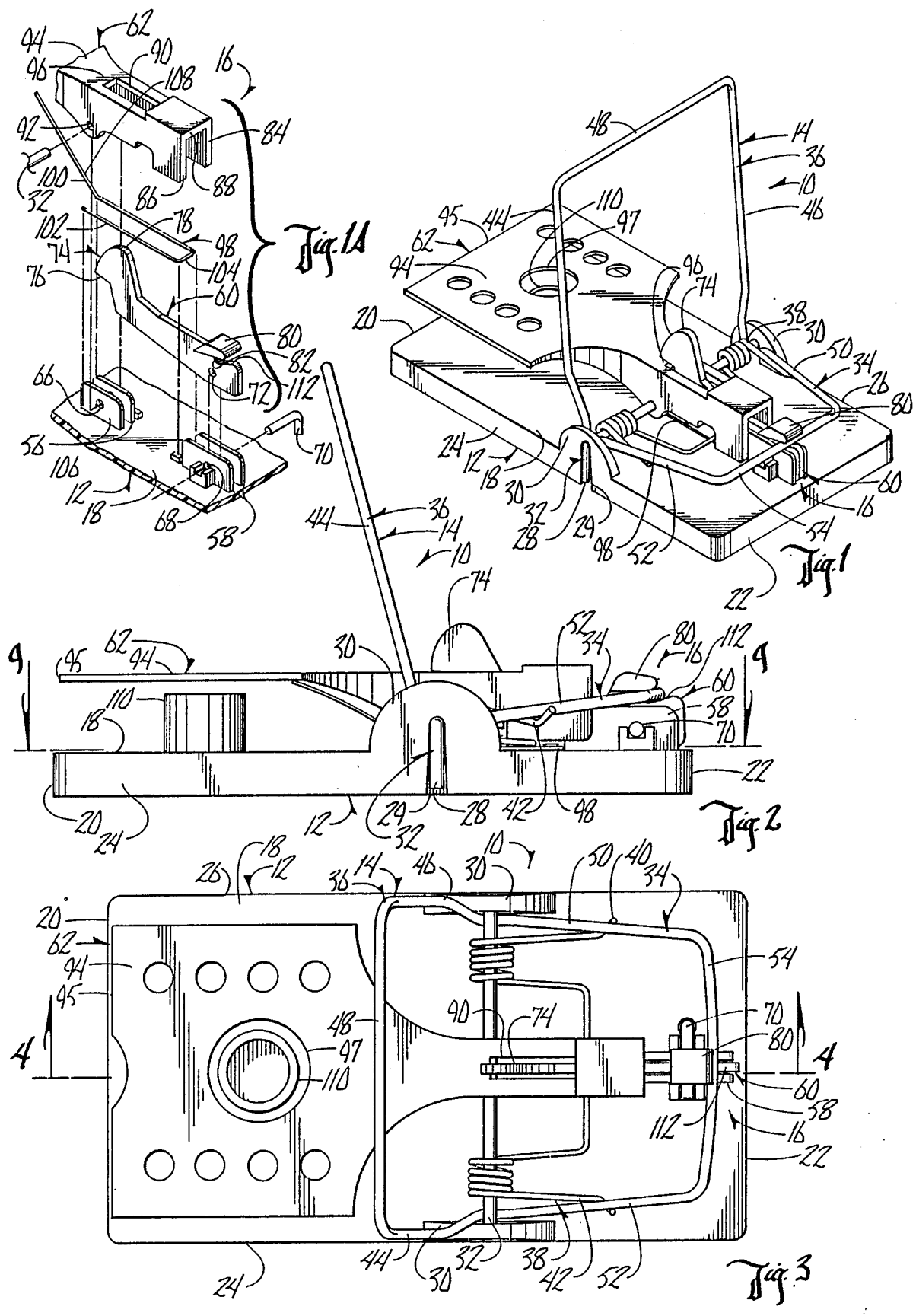

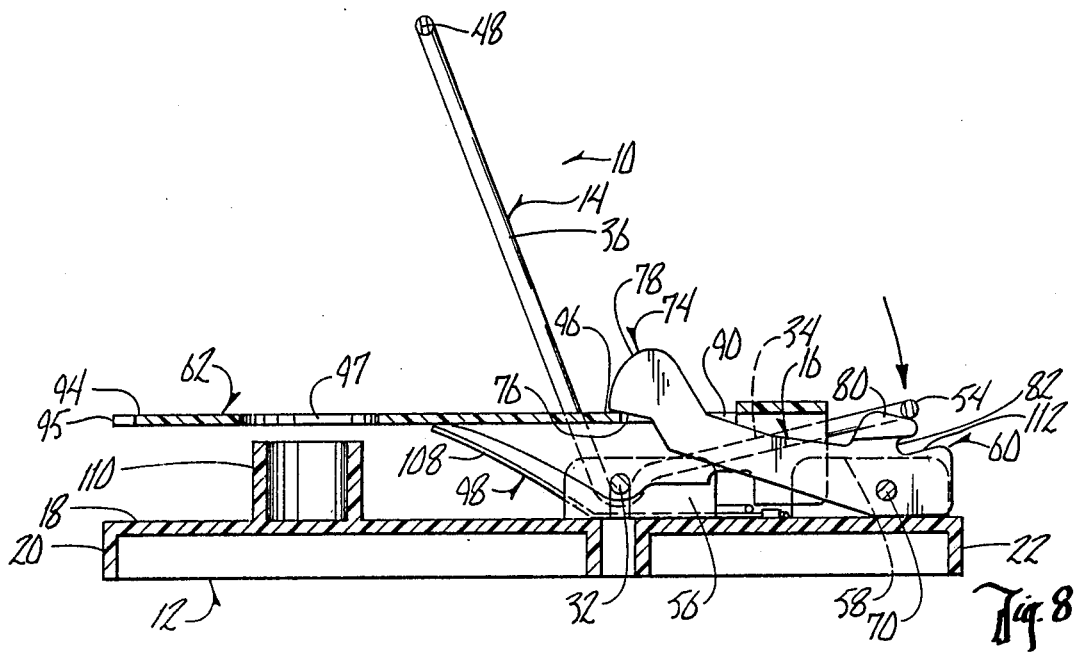
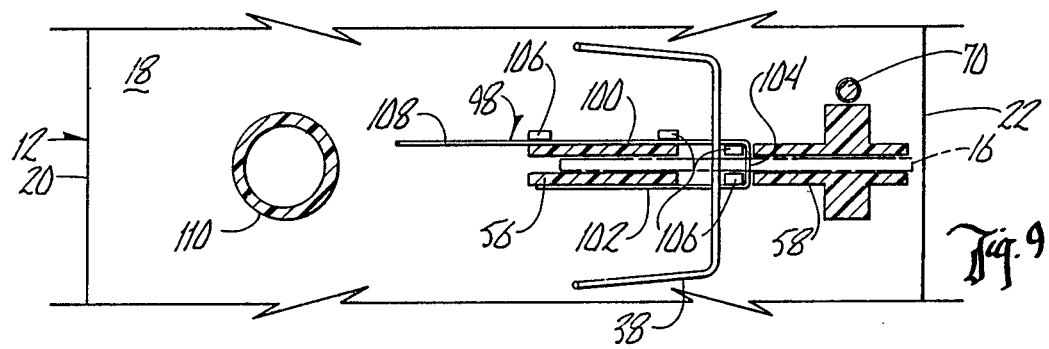

ANIMAL TRAP

BACKGROUND OF THE INVENTION

This invention relates to animal traps and to a method for using the same.

Numerous types of mouse and rat traps are widely used to catch and remove these pests. The conventional mouse trap includes a bar which is spring mounted and which pivots from a cocked position to a sprung position in response to the trap being tripped by the animal. There are several disadvantages with this type of conventional trap.

The setting of these conventional traps is often hazardous to the hands and fingers, since it is necessary to place the hands and fingers in the path of the spring mounted bar during setting. Occasionally, the catch mechanism of these prior traps is unreliable and releases before the person setting the trap can remove his fingers or hands from the hazardous area in the path of the spring mounted bar. The catches are sometimes too sensitive to be usable and other times they are too insensitive to respond to the mouse or rat taking the bait. Furthermore, the catches used on these devices are not durable and sometimes the trap must be discarded after one use.

Another problem is encountered in the release of the trapped animal from the trap. This is a difficult and messy task inasmuch as it is necessary to grasp the bar which has killed the animal and move the bar to release the animal from the trap. This entails touching the bar in the vicinity of the animal and sometimes even requires touching the animal itself.

Another problem encountered with conventional rodent traps stems from the positioning of the bait on the trip member or tongue of the trap. Occasionally, a rodent can remove the bait from the top surface of the tongue without tripping the trap.

One type of trap which has overcome the difficulties referred to above is shown in U.S. Pat. Nos. 4,297,805 and 4,369,595. The trap shown in these two patents includes a jaw frame which is detachably held in a cocked position by a catch member. The catch member is held in retentive engagement with the jaw frame by a trip member. The trip member will release the catch member in response to engagement by the animal to be trapped. This causes the catch member to release the jaw frame and a spring causes the jaw frame to snap to a sprung position for killing the animal.

When the device shown in U.S. Pat. Nos. 4,297,805 and 4,369,595 is reset, the jaw frame is forceably moved back to its cocked position, and during this movement the jaw frame engages the catch member. The catch member cams out of the path of the jaw frame to permit the jaw frame to pass by, and then the catch member returns to its original position so that it will engage and hold the jaw frame in its cocked position. This camming movement of the catch frame can under certain circumstances, be prevented if the trip member is in its set position. In such a situation, the trip frame holds the catch frame against movement in response to the setting of the jaw frame, and the jaw frame is not free to move to its cocked position.

In U.S. Pat. Nos. 4,369,595 and 4,297,805, a reset member is used to move the trip frame out of retentive engagement with the catch frame during the setting of the trap. This prevents the catch frame from being held against movement and permits it to cam out of the way of the jaw frame during the resetting of the trap.

Therefore, a primary object of the present invention is the provision of an improved animal trap and method for using same.

A further object of the present invention is the provision of an animal trap which can be set without placing the hands and fingers in a position of jeopardy with respect to the spring mounted bar of the trap.

A further object of the present invention is the provision of an animal trap which eliminates the need for a separate reset member during the resetting of the trap.

A further object of the present invention is the provision of an improved animal trap wherein the jaw frame always holds the trip member free from engagement with the catch frame whenever the jaw frame is in its sprung position.

A further object of the present invention is the provision of an improved animal trap which has a small spring for yieldably urging the trip member to its set position, the spring providing a weaker force than that exerted by the jaw frame so as to yield to the force exerted by the jaw frame whenever the jaw frame is in its sprung position.

A further object of the present invention is the provision of an improved animal trap which utilizes a catch mechanism which automatically sets when the bar is moved to its cocked position.

A further object of the present invention is the provision of an improved animal trap having a catch mechanism which is reliable in grasping and holding the bar in its cocked position without accidental release.

A further object of the present invention is the provision of an improved animal trap having a catch mechanism which is constant in the amount of pressure required to trip the trap. The weight of the bait is not on the trip mechanism and therefore does not affect the pressure needed to trip it.

A further object of the present invention is the provision of a mouse trap having a trip mechanism that is very sensitive to the animal's touch and which will spring the trap in response to a very light touch by the animal.

A further object of the present invention is the provision of a trap which can be emptied without touching the dead animal.

A further object of the present invention is the provision of a trap having an automatic reset mechanism which is engaged by the bar as the bar moves to its cocked position and which responds to this engagement to place the remaining parts of the trap in a position whereby they will receive and hold the bar in its cocked position.

A further object of the present invention is the provision of a trap which permits placement of the bait on the trap base platform and which includes a trip member surrounding the bait so that the rodent cannot reach the bait without engaging the trip member and spring the trap.

A further object of the present invention is the provision of a trap which is durable and which can be reused numerous times.

A further object of the present invention is the provision of a device and method for using same which is simple and economical.

SUMMARY OF THE INVENTION

The present invention comprises a trap which is similar in construction to the standard mouse trap construction, but which includes numerous features which provide significant improvement thereover. One feature involves the use of two U-shaped members in the place of a single U-shaped member found in conventional traps. One of the U-shaped members is utilized for the conventional purpose of springing towards the animal and killing it on impact. The other U-shaped member is utilized for grasping by the operator and for pivoting the trap to its cocked position during setting.

Another feature involves the use of a unique trip-catch mechanism which releasably holds the U-shaped members in a cocked position, and which reliably trips and releases the U-shaped bar in response to the animal touching the bait. The trip-catch mechanism permits setting of the trap without placing one's hands in the path of the spring mounted U-shaped member. Furthermore, the trap can be emptied without the necessity of touching the dead animal or the bar which struck it.

Another feature is the use of a tongue or trip member which has an open center and a perimetric edge surrounding the open center. The bait is placed on the trap base or platform immediately below the open center of the trip member. The animal cannot reach the bait without climbing over and placing his weight upon the perimetric edge of the trip member.

Another feature of the present invention is the elimination of the reset member shown in U.S. Pat. Nos. 4,369,595 and 4,297,805.

Another feature of the present invention is the provision of a jaw frame which engages the trip member and forces the trip member out of engagement with the catch member whenever the jaw frame is in its sprung position.

Another feature of the present invention is the provision of an improved animal trap wherein the trip frame permits the catch frame to fall by gravity to its release position whenever the jaw frame is in its sprung position.

BRIEF DESCRIPTION OF THE DRAWINGS

FIG. 1 is a perspective view of the present invention.

FIG. 1A is a partial exploded perspective view of the catch and trip mechanisms of the present invention.

FIG. 2 is a side elevational view of the device shown in FIG. 1.

FIG. 3 is a top plan view of the device shown in FIG. 1.

FIG. 8 is a view similar to FIGS. 4, 5 and 6, but illustrating the difficulty encountered in resetting the present invention if the jaw members do not push the trip member downwardly as shown in FIG. 7.

FIG. 9 is a partial sectional view taken along line 9—9 of FIG. 2.

DETAILED DESCRIPTION OF THE INVENTION

Figure 4:
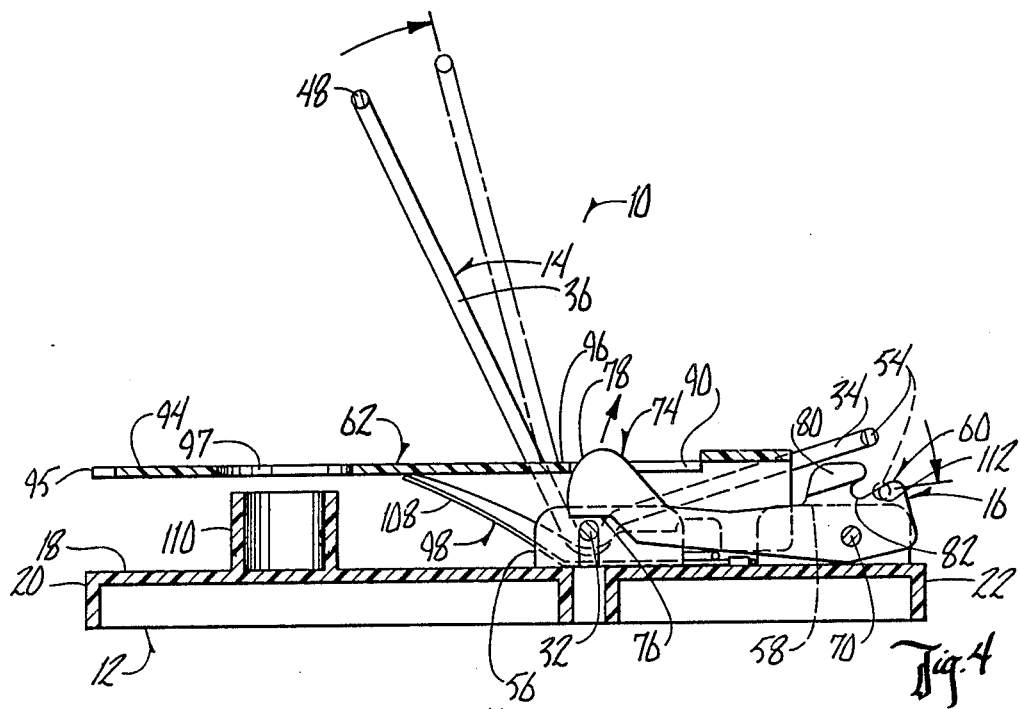
FIG. 4 is a sectional view taken along line 4—4 of FIG. 3.

Referring to the drawings, the numeral 10 generally designates the animal trap of the present invention. Trap 10 comprises a base platform 12, a pivoting jaw frame 14 and a trip catch mechanism 16. Platform 12 comprises an upper surface 18, a forward end 20, a rearward end 22, and opposite sides 24, 26.

Extending upwardly from the approximate longitudinal center of side edges 24, 26 are a pair of ears 30. Journaled within ears 30 and extending therebetween is an axle 32 having an L-shaped end 28 fitted within a groove 29. Groove 29 prevents axle 30 from rotating. This is important because axle 30 has a slight camber to it, and holding axle 30 against rotation prevents eccentric rotation of the cabered portion of axle 30.

Jaw frame 14 is formed from a continuous wire formed in the shape of a rectangle. The rectangle is folded into two U-shaped members 34, 36 which are at approximately right angles with respect to one another. The apex between U-shaped members 34, 36 surrounds axle 32 so that axle 32 provides a pivot point for jaw member 14. A spring member 38 surrounds axle 32, and includes spring ends 40, 42 which engage jaw frame 14 in such a manner to clamp jaw frame 14 to axle 32 and also to bias jaw frame 14 from the cocked position shown in FIG. 1 to the sprung position shown in FIG. 7.

U-shaped member 36 includes a pair of opposite legs 44, 46 joined by a cross-bar 48. Similarly, U-shaped member 34 includes a pair of opposite legs 50, 52 joined by cross-bar 54.

Trip catch mechanism 16 comprises a first pair 56 of spaced apart vertical flanges and a second pair 58 of spaced apart vertical flanges, both of which are fixed to the upper surface of base platform 12. Catch mechanism 16 also includes a catch member 60, and a trip member 62. Flange pair 56 includes a forward axle hole 66, and flange pair 58 includes a rearward axle hole 68. Forward axle hole 66 receives axle 32 and rearward axle hole 68 receives a second axle 70.

Catch member 60 includes a hole 72 for receiving pin 70 so as to pivotally mount catch member 60 about axle 70. It should be noted that hole 72 is located away from the center of gravity of catch member 60 so that gravity causes catch member 60 to pivot in a counterclockwise direction as viewed in FIG. 1A. At the forward end of catch member 60 is a trip pawl 74 having a downwardly presented flat surface 76 and an upwardly presented cam surface 78, which is beveled slightly.

A catch pawl 80 having a notch 82 is located adjacent and above hole 72 so as to move in an arcuate path about hole 72 during rotation of catch member 60 about the axis provided by hole 72.

Trip member 62 comprises in cross section a yoke-like frame having two downwardly presented legs 84, 86 joined at their upper ends by a web 88. A rectangular hole 90 is formed in web 88 adjacent the forward end thereof and is adapted to receive trip pawl 74 therein. An axle receiving hole 92 is formed in legs 84, 86 and is adapted to receive axle 32 which extends through flanges 56, 58 and also through legs 84, 86 so as to pivotally mount trip member 62 for pivotal movement about the axis provided by axle 32. A tongue 94 is provided at the extreme forward end of trip member 62. A pawl receiving surface 96 is formed at the forward upper margin of hole 90 and is adapted to receive flat surface 76 of pawl 74.

Tongue 94 comprises a forward end 95 and an open center 97. While the shape of tongue 94 may be varied, it should be sufficiently large that the rodent can see the bait and so that he will attempt to reach the bait by climbing over tongue 94 to reach the bait. When he touches the tongue 94, he triggers the trap.

A J-shaped spring 98 includes a long leg 100, a short leg 102 and a cross-leg 104. Legs 100, 102 embrace the outside of spaced apart flanges 56, and are held in place by four tabs 106 (FIG. 9) which protrude upwardly from the upper surface 18 of base platform 12.

Figure 5:
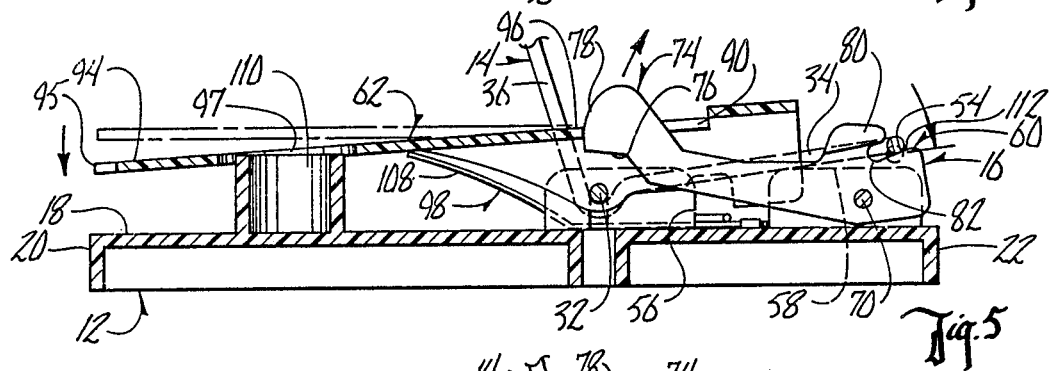
FIG. 5 is a sectional view similar to FIG. 4 but showing the parts in a slightly different position.
Figure 6:
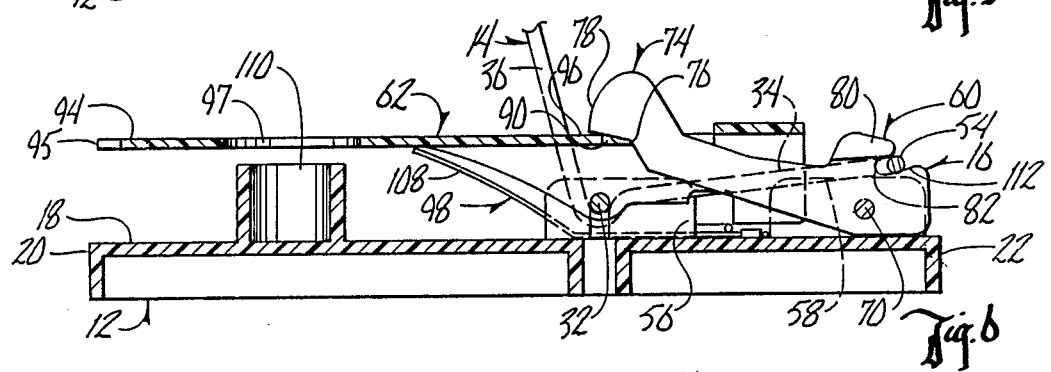
FIG. 6 is a view similar to FIGS. 4 and 5, but showing the parts in a slightly different position.

As can be seen in FIGS. 2-8, the long leg 100 includes an upwardly bent portion 108 which engages the undersurface of trip member 62 and urges trip member 62 to its approximate horizontal position shown in FIGS. 2, 4, and 6. J-shaped spring 98 is substantially weaker in strength compared to spring member 38. The purpose of J-shaped spring 98 is to counterbalance the weight of trip member 62 so that when trip member 62 is not exposed to forces other than gravity, it will assume the position shown in FIGS. 2, 4 and 6. However, when spring member 38 causes jaw frame 14 to move to its sprung position shown in FIG. 7, the horizontal bar 48 of U-shaped frame 36 engages the upper surface of the forward end 95 of trip member 62, and overcomes the bias of J-shaped spring 98 so as to urge trip member 62 to its trip position shown in FIG. 7. In this regard, the forward end 95 of trip member 62 is positioned further away from the axle 32 than is the horizontal bar 48, thereby insuring that horizontal bar 48 will engage the upper surface of tip 95. In prior art traps, the horizontal bar 48 protrudes beyond the tip 95 of the trip member 62 so as to prevent horizontal bar 48 from engaging trip member 62. Thus, the engagement of trip member 62 by horizontal bar 48 is one of the novel features of the present invention.

A bait receptacle 110 is fixed to the upper surface 18 of platform 12 and is registered below hole 97 in trip member 62.

The operation of the device is as follows: When the trap is in the position shown in FIG. 7, jaw frame 14 is held by spring 38 with U-shaped member 36 in facing engagement with the upper surface of base platform 12 and trip member 62. The operator grasps upstanding U-shaped frame 34 and pivots this frame rearwardly in a clockwise direction as shown in FIG. 4.

At this point, bar 54 engages a bar receiving surface 112 on the rearward end of catch member 60. Continued downward movement of bar 54 causes a rotation of catch member 60 in a clockwise direction about axis 70 from the position shown in FIG. 5 to the position shown in FIG. 6. In FIG. 6, it should be noted that bottom surface 76 of trip pawl 74 has risen to engage the pawl receiving surface 96 of trip member 62. When the device has been moved to the position shown in FIG. 6, the operator releases the downward pressure he is exerting on cross bar 54, and the spring 38 causes cross bar 54 to be yieldably urged upwardly. However, the rotation of catch member 60 to the position shown in FIG. 6 causes catch pawl 80 to move above cross bar 54 so as to block the upward movement of cross bar 54. Trip pawl 74 is urged downwardly, but engages the pawl receiving surface 96, thereby preventing any further counterclockwise rotation of catch member 60. Thus, all the parts are held in rigid fixed position shown in FIG. 6 with pawl receiving surface 96 preventing further counterclockwise rotation of catch member 60, and with catch pawl 80 preventing further upward movement of crossbar 54. Spring 98 yieldably urges trip member 62 to the horizontal position shown in FIGS. 2, 4 and 6.

The entire mechanism can be released by downward pressure on the tongue 94. This downward pressure is normally supplied by the animal attempting to reach or climb over tongue 94 to reach the bait which rests on a pedestal 110. Downward pressure on tongue 94 cause rotation of trip member 62 in a counterclockwise direction about axis 32. This causes surface 96 to swing out of retentive engagement with pawl 74, thereby permitting pawl 74 and catch member 60 to rotate in a counterclockwise direction from the catch position shown in FIG. 6 to the release position shown in FIG. 7. This rotation of catch member 62 also causes pawl 80 to move out of retentive engagement or blocking engagement with cross bar 54, and the spring force from spring 38 causes cross bar 54 to swing upwardly from the position shown in FIG. 6 to the position shown in FIG. 7, thereby springing the trap and causing U-shaped member 36 to descend rapidly on the animal which tripped the tongue 94.

Figure 7:
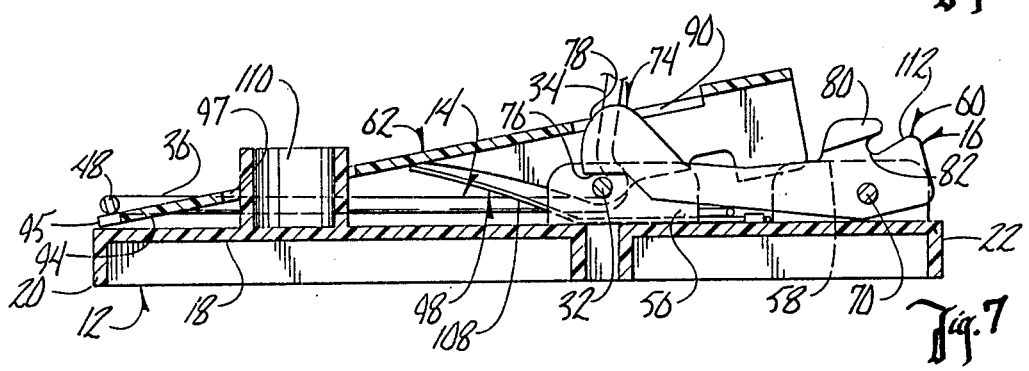
FIG. 7 is a view similar to FIGS. 4, 5 and 6, but showing the jaw members in the sprung position.

When the jaw frame 14 has rotated to the position shown in FIG. 7, it is important to note that cross bar 48 depresses forward edge 95 of trip member 62 to its trip position, and overcomes the bias of spring 98 to do so. This feature is important because it permits the pawl 74 of catch member 60 to clear the pawl receiving surface 96 of trip member 62, and to fall downwardly to the position shown in FIG. 7. Whenever jaw frame 14 is in the position shown in FIG. 7, catch member 60 is free to fall by gravity to its release position shown in FIG. 7.

FIG. 8 illustrates a difficulty which would be encountered if cross bar 48 did not depress trip member 62 so as to permit catch member 60 to fall to the position in FIG. 7. If trip member 62 is always permitted to remain in its horizontal position shown in FIG. 8, it is possible that under certain conditions the pawl 74 may remain in the position shown in FIG. 8 with pawl 74 engaging pawl receiving surface 96. When this condition occurs, horizontal bar 54 cannot clear catch pawl 80, and it is not possible to reset the trap. In order for cross bar 54 to be able to clear pawl 80, it is necessary for catch member 60 to be dropped to its release position shown in FIG. 7. If catch member 60 is in the position shown in FIG. 8, it will not permit the resetting of the trap. Therefore, the fact that horizontal bar 48 depresses trip member 62 to the position shown in FIG. 7 is important because it permits catch member 60 to fall to its position shown in FIG. 7. In this position, the trap can be reset because horizontal bar 54 will clear catch pawl 80 and permit the device to be set as shown in FIGS. 4–6.

Another important feature of the present invention is the function provided by J-shaped spring 98. Whenever horizontal bar 48 is lifted upwardly from trip member 62, the upwardly bent portion 108 of spring 98 yieldably urges the trip member 62 to its horizontal position shown in FIGS. 2, 4, and 6. Without spring 108, trip member 62 is free to fall to the position shown in FIG. 7, which would prevent catch pawl 74 from being retentively engaged by pawl receiving surface 96. Thus, it is important that the trip member 62 be returned to its horizontal position during the resetting of the trap.

Thus, it can be seen that the device accomplishes at least all of its stated objectives. The trap can be set without placing one's hands or fingers in jeopardy of being hit by U-shaped member 36. It is merely necessary to grasp U-shaped member 34 and force it downwardly until it is retentively held by catch pawl 80. The only action which is necessary to set the trap is to swing cross bar 54 downwardly as far as it will go, and then release cross bar 54. Such action will result in setting of the trap.

Thus, the catch mechanism automatically sets when the cross bar 54 is moved to its set position. The catch mechanism is quite reliable, and the danger of an accidental release of the trap is minimized by the present catch mechanism. The trip mechanism of the present invention has been found to be highly sensitive, and is triggered by a very nominal downward pressure on tongue 94.

Emptying of the present trap is also simple and clean inasmuch as it is merely necessary to grasp cross bar 54 and pivot jaw frame 14 in a clockwise direction so as to release the animal from the trap. It is not necessary to touch the animal or to touch the U-shaped frame which has descended upon the animal.

The device is very durable, and may be manufactured economically. Therefore, it can be seen that the device accomplishes at least all of its stated objectives.

What is claimed is:

1. An animal trap comprising:
   a base having an upper surface, opposite sides, and opposite ends;
   a jaw frame pivotally mounted on said base for pivotal movement about a horizontal jaw frame axis between a cocked position and a sprung position;
   first spring means yieldably urging said jaw frame towards said sprung position;
   a catch member pivotally mounted to said base for pivotal movement about a horizontal catch member axis between a catch position and a release position, said catch member having a catch pawl thereon for retentively engaging said jaw frame when said jaw frame and said catch member are in said cocked position and said catch position, respectively, said catch member being pivotal to said release position for moving said catch pawl out of retentive engagement with said jaw frame, thereby freeing said jaw frame for movement to said sprung position;
   a trip member pivotally mounted to said base for pivotal movement about a horizontal trip member axis between a set position and a trip position, said trip member having a catch receiving surface;
   said catch recieving surface of said trip member retentively engaging said catch member when said catch member and said trip member are in said catch positions and said set positions, respectively;
   said catch receiving surface of said trip member moving out of retentive engagement with said catch member whenever said trip member moves to said trip position, thereby freeing said catch member for movement to said release position to permit said jaw frame to move to said sprung position;
   said jaw frame engaging said trip member and yieldably holding said trip member in said trip position whenever said jaw frame is in said sprung position, thereby freeing said catch member to move to said release position;
   a second spring engaging said trip member and yieldably urging said trip member toward said set position, said second spring comprising a long leg having first and second portions, a cross leg extending perpendicular to said first portion of said long leg, and a short leg extending parallel to and in the same direction as said first portion of said long leg, said second portion of said long leg extending upwardly and engaging said trip member and yieldably urging said trip member toward said set position with a force which is less than and yieldable in response to the force exerted by said jaw frame on said trip member when said jaw frame is in said sprung position.

* * * * *